US012558832B2

(12) United States Patent
Gradl-Lami et al.

(10) Patent No.: US 12,558,832 B2
(45) Date of Patent: Feb. 24, 2026

(54) DEVICE FOR PROCESSING MATERIAL, IN PARTICULAR PLASTICS MATERIAL

(71) Applicant: PURELOOP GESMBH, Ansfelden (AT)

(72) Inventors: Klaus Gradl-Lami, Schoenau im Muehlkreis (AT); Manfred Dobersberger, Linz (AT); Florian Gruber, Schwanenstadt (AT); Klaus Feichtinger, Linz (AT)

(73) Assignee: PureLoop GesmbH, Ansfelden (AT)

( * ) Notice: Subject to any disclaimer, the term of this patent is extended or adjusted under 35 U.S.C. 154(b) by 552 days.

(21) Appl. No.: 17/769,691

(22) PCT Filed: Oct. 13, 2020

(86) PCT No.: PCT/AT2020/060365
§ 371 (c)(1),
(2) Date: Apr. 15, 2022

(87) PCT Pub. No.: WO2021/072465
PCT Pub. Date: Apr. 22, 2021

(65) Prior Publication Data
US 2023/0001621 A1　　Jan. 5, 2023

(30) Foreign Application Priority Data

Oct. 16, 2019　(AT) ............................... A 50893/2019

(51) Int. Cl.
*B29C 48/685*　　(2019.01)
*B29B 17/00*　　(2006.01)
(Continued)

(52) U.S. Cl.
CPC .......... *B29C 48/687* (2019.02); *B29C 48/287* (2019.02); *B29C 48/361* (2019.02);
(Continued)

(58) Field of Classification Search
CPC ..... B29C 48/385; B29C 48/39; B29C 48/375; B29C 48/687; B29C 48/361;
(Continued)

(56) References Cited

U.S. PATENT DOCUMENTS 6,877,685 B2 * 4/2005 Barth .................. B02C 18/2233
241/243
9,487,635 B2 * 11/2016 Kirchhoff ............. B29C 48/385
(Continued)

FOREIGN PATENT DOCUMENTS

AT　　　　407971 B　*　7/2001　.......... B02C 18/141
DE　　197 14 944 A1　4/1998
(Continued)

OTHER PUBLICATIONS

AT407971B Espacenet Machine Translation (Year: 2024).*
(Continued)

*Primary Examiner* — Seyed Masoud Malekzadeh
(74) *Attorney, Agent, or Firm* — Kilpatrick Townsend & Stockton LLP

(57) ABSTRACT

Disclosed is a device for processing plastic materials, having a shredding unit, a conveying unit having a screw (7), and an extruder, having at least one extruder screw (11), adjoining the screw, wherein the central longitudinal axis (3) of the screw (7) is oriented at an angle to the central longitudinal axis (10) of the extruder screw (11), in particular at an angle of 80° to 100°, preferably 90°, and the longitudinal axis (3) of the screw (7) is offset with respect to the longitudinal axis (10) of the extruder screw (11) by an offset (v) in the direction of the direction of rotation (12) of the extruder screw (11) at or in the region of the discharge opening (8) or the intake opening (16) of the conveying unit.

15 Claims, 4 Drawing Sheets

(51) Int. Cl.

| | | |
|---|---|---|
| *B29B 17/04* | (2006.01) | |
| *B29C 48/285* | (2019.01) | |
| *B29C 48/36* | (2019.01) | |
| *B29C 48/385* | (2019.01) | |
| *B29C 48/39* | (2019.01) | |
| *B29C 48/525* | (2019.01) | |

(52) U.S. Cl.

CPC .......... *B29C 48/385* (2019.02); *B29C 48/525* (2019.02); *B29B 17/0026* (2013.01); *B29B 2017/0476* (2013.01); *B29C 48/39* (2019.02)

(58) Field of Classification Search

CPC .............. B02C 18/141; B02C 18/2291; B29B 17/0026; B29B 2017/0476

See application file for complete search history.

(56) References Cited

U.S. PATENT DOCUMENTS

| | | | | |
|---|---|---|---|---|
| 9,738,770 | B2 * | 8/2017 | Kirchhoff | ............. B29C 48/268 |
| 11,400,632 | B2 * | 8/2022 | Kobayashi | .............. B29B 7/726 |
| 11,472,065 | B2 * | 10/2022 | Conrad | ................... B29B 7/429 |
| 2003/0015612 | A1 * | 1/2003 | Barth | ................. B29B 17/0036 |
| | | | | 241/260.1 |
| 2005/0006850 | A1 * | 1/2005 | Barth | .................... B29C 48/501 |
| | | | | 277/300 |
| 2008/0175940 | A1 * | 7/2008 | Barth | ...................... B29B 7/885 |
| | | | | 425/202 |
| 2009/0004325 | A1 * | 1/2009 | Bacher | .................... B29B 7/728 |
| | | | | 425/586 |
| 2010/0140381 | A1 * | 6/2010 | Weigerstorfer | ......... B29B 13/10 |
| | | | | 241/23 |
| 2011/0049763 | A1 * | 3/2011 | Hackl | ..................... B29C 45/18 |
| | | | | 425/197 |
| 2012/0091609 | A1 * | 4/2012 | Feichtinger | ......... B29B 17/0412 |
| | | | | 241/98 |
| 2013/0113139 | A1 * | 5/2013 | Weigerstorfer | ..... B29B 17/0412 |
| | | | | 264/340 |
| 2014/0271968 | A1 * | 9/2014 | Feichtinger | ............. B29C 48/04 |
| | | | | 425/202 |
| 2015/0218335 | A1 * | 8/2015 | Kirchhoff | ............... B29C 48/54 |
| | | | | 366/75 |
| 2015/0328801 | A1 * | 11/2015 | Vainer | ..................... B29C 48/92 |
| | | | | 241/3 |
| 2017/0058095 | A1 * | 3/2017 | Kirchhoff | ........... B29C 48/2564 |
| 2018/0147747 | A1 * | 5/2018 | Brzezowsky | ....... B29B 17/0026 |
| 2021/0053253 | A1 * | 2/2021 | Jones | ........................ B29B 7/94 |
| 2022/0001579 | A1 * | 1/2022 | Kroiss | .................. B29C 48/277 |

FOREIGN PATENT DOCUMENTS

| | | | | |
|---|---|---|---|---|
| EP | 1 343 623 A1 | 9/2003 | | |
| EP | 1 918 084 A1 | 5/2008 | | |
| WO | WO-03076153 A1 * | 9/2003 | .......... B30B 15/308 | |

OTHER PUBLICATIONS

WO3076153A1 Espacenet Machine Translation (Year: 2024).*

International Preliminary Report on Patentability in related International Application No. PCT/AT2020/060365 of Apr. 19, 2021 (six pages).

* cited by examiner

DEVICE FOR PROCESSING MATERIAL, IN PARTICULAR PLASTICS MATERIAL

This application is a U.S. National Phase Application of PCT/AT2020/060365, filed Oct. 13, 2020, which claims the priority of Austrian Patent Application A 50893/2019, filed Oct. 16, 2019, the entireties of which are incorporated by reference herein.

The invention relates to a device for processing material according to the preamble of claim 1.

Single-shaft shredders are often applied when processing materials to be shredded, especially those made of thermoplastics. Such single-shaft shredders find application in numerous fields, especially for shredding plastics material to be preshredded for recycling purposes. Such material usually appears in the form of films or extrusion start-up pads, bottles and other containers, mostly in a soiled state.

There are single-shaft shredders which in one working step heat the shredded particles, partly through the cut, and transport them further into a conical transition which is formed as a single-screw. These particles are further compressed in the mostly conical part and partially further heated. A part of these thermoplastic particles soften in the process. An extruder then follows on the same axis, further compressing and heating these particles and converting them to a liquid state. Such devices are known, for example, from AT 407 971 B. However, above a certain size, such a design leads to very large and long systems that can no longer be operated well.

In addition, to enable scaling to higher throughputs or sizes, it is necessary to move away from a single drive. It is possible to directly couple a separate extruder, primarily with its own drive, to the shredding unit, also primarily with its own drive.

However, the way the pretreated material is fed into the extruder is always a very critical point. Unfavourable feeding often leads to insufficient and unstable filling levels in the extrusion screw, which in turn prevents efficient or sufficient quality extrusion.

Basically, every tamping process or filling process into an extruder is critical. In many cases, a change in direction of the material and a partial closing of the intake opening by the screw flight of the extruder must also be taken into account. These are two major influencing factors.

In some devices, mixing and shredding tools rotating in a vessel succeed in creating a charging pressure, provided the material is in particulate, fluid form. This also has the advantage that excess material that cannot be taken up by the extruder is returned to the container. However, this is much more difficult with a tamping screw.

It is thus object of the present invention to create a device which, on the one hand, has a reasonable size at higher throughputs and can be operated well, and at the same time ensures advantageous filling of the extruder and efficient or high-quality extrusion.

This object is solved in such a device by the characterising features of claim 1. According to the invention, it is thus provided that the central longitudinal axis of the screw is oriented at an angle to the central longitudinal axis of the extruder screw, in particular at an angle of 80° to 100°, preferably 90°, and the longitudinal axis of the screw is offset with respect to the longitudinal axis of the extruder screw by the offset (v), as depicted in FIG. 3, in the direction of the direction of rotation of the extruder screw at or in the region of the discharge opening or the intake opening.

Due to the coupling of the screw being at an angle, in particular a conveying, transport or agglomerating screw, to the extruder, wherein the material is conveyed laterally into the extruder, on the one hand it is ensured that the dimensions of the device are compact even at higher throughput rates and that the system remains readily operable.

In addition, due to the special offset of the longitudinal axis of the screw with respect to the longitudinal axis of the extruder screw, a better and more stable filling of the extruder is ensured. The change in direction of the material caused by the arrangement at an angle in particular results in even more special requirements here.

On the one hand, the special offset creates a certain amount of space for the material to be deflected in the extruder intake. So if there is a slight overfeeding here, that can already be cushioned to some degree by this.

On the other hand, the special geometry in the coupling region must be taken into account: Thus, the "corkscrew" from the screw rotates against or in the direction of the extruder device, i.e. against the active flank of the extruder screw. A screw always has a higher density on the active flank than on the passive flank, especially when the material has not yet melted and the screw is partially filled. This more compressed material, which also partially sticks together, retains the screw shape after leaving the conveying screw and is thus pressed against the active flank of the extruder screw. In addition to more stable filling, this also causes some further compression.

The longitudinal axis of the screw and the longitudinal axis of the extruder screw are just not at the same height in the process. They are oriented at an angle, advantageously substantially perpendicularly, to one another and define an x-axis and a y-axis. The offset occurs in the z-axis, thus in a direction normal to the longitudinal axis of the screw and to the longitudinal axis of the extruder screw. The direction of the offset is essential in this process. The offset namely occurs in the direction in which the extruder screw rotates in the region of or directly in front of the discharge opening. In case the extruder screw rotates counterclockwise, thus for example, as viewed from behind or from the drive of the extruder, the offset occurs downwards when the screw enters the extruder laterally from the left and thus feeding occurs from the left, also as viewed from behind or from the drive. As long as the offset of the longitudinal axis of the screw in the z-axis occurs in the intended direction, it is therefore irrelevant whether the offset of the screw—depending on the direction of rotation of the extruder screw and/or the feed side into the extruder—occurs slightly upwards or downwards compared to the extruder screw.

According to a particularly advantageous embodiment, the longitudinal axis of the screw is arranged below the longitudinal axis of the extruder, i.e. with the device in the operating state, the screw is somewhat closer to the bottom than the extruder screw. The feeding of the extruder thus occurs into the region of the extruder screw that is somewhat closer to the bottom.

The screw preferably always opens out into the lateral region of the extruder, even if it is an extruder having multiple screws, in particular a twin-screw extruder. In this case, the screw advantageously opens out approximately into the plane spanned by the longitudinal axes of the extruder screws.

According to a preferred embodiment, it is provided that the offset is in the range of $0<v<R$, wherein R is the radius of the extruder screw. In this way, a particularly advantageous feeding of the extruder is possible.

According to another preferred embodiment, it is provided that the intake opening of the extruder has, in the direction of the offset, a bottom surface which is inclined at an angle α with respect to the longitudinal axis and opening outwards, wherein the angle α is in the range of 0°<α<20°. The bottom surface is thus sloped such that a kind of wide access ramp for the material fed to the extruder is created which then rises and steadily reduces the region of the feed as the material gets closer to the extruder screw.

It is further advantageous if the, in particular cylindrical, shredding housing has a larger inner diameter than the, in particular cylindrical, housing of the screw. This makes it easy to achieve precompression of the material. For design reasons, too, it is usually desirable to design the screw housing with a smaller diameter than the housing of the shredder in order to achieve a large holding volume for the latter and, on the other hand, to keep the effort for the screw smaller.

In this context, it is particularly advantageous when the housing is cylindrical or has a conical shape.

A favourable embodiment of the invention results when the housing of the screw is coaxially or equiaxially connected to the discharge opening of the housing of the rotor body, wherein one front side of the housing of the screw forms the intake opening for the material to be conveyed or plasticised by the screw, which then exits, in particular in the partially plasticised state, at the other front side of this housing. This has the advantage that the heat occurring in the shredder, which is due to the cutting processes and friction, is immediately carried on without loss through the processed material into the plasticising region, where it is made effective for plasticising the material.

According to a most preferable embodiment, it is provided that the shredding housing, which is larger in diameter, and the housing of the screw, which is smaller in diameter, thus the shredding unit and the screw, are connected to one another by a conical transition portion. It is particularly advantageous when a conical screw is arranged in the conical transition portion for conveying and, above all, also for compressing the material. Due to the compression in the conical transition, a heating occurs in this region. Furthermore, partial agglomeration of the material can occur. This initially produces preheated and precompressed material in the conical transition to the tamping screw. This simplifies the change of direction and keeps the filling level of the extruder screw high. The compression of the material already occurs upstream of the screw—in contrast to plant combinations in which, downstream of a single-shaft shredder, tamping screws without a special precompression device convey the largely uncompressed material into the extruder, or in which the screw only carries out compression immediately before entering the extruder. The compression of the material and the supply into the extruder are therefore also separated locally. This results in sufficient and stable filling levels in the extrusion screw, thus ensuring particularly efficient and high-quality extrusion.

According to a further preferred embodiment, it is accordingly provided that the material leaves the conical part preferably into a cylindrical or conical single-screw, which subsequently conveys the material into the extruder. During this, the material is further heated or tempered and fed into the side of the extruder screw.

The screw can advantageously be designed as a non-compressing conveying screw or a screw which at least partially compresses, plasticizes and/or agglomerates the material, in particular a plasticiser screw.

A structurally advantageous solution for the drive results when the screw forms a support for the rotor body with an extension of its core projecting into the front end of the rotor body facing it. In this case, the screw flights abutting the inner wall of the housing of the screw form the bearing for the other end of the rotor body. There is therefore no need for a different type of bearing for the discharge end of the rotor body.

In this context, it is particularly advantageous when the rotor body is coupled to the screw, and optionally also to the conical screw, in a rotationally locked manner and is driven by a common drive.

In the drawings, the object of the invention is shown schematically and by way of example by means of embodiment examples:

Figure 1:
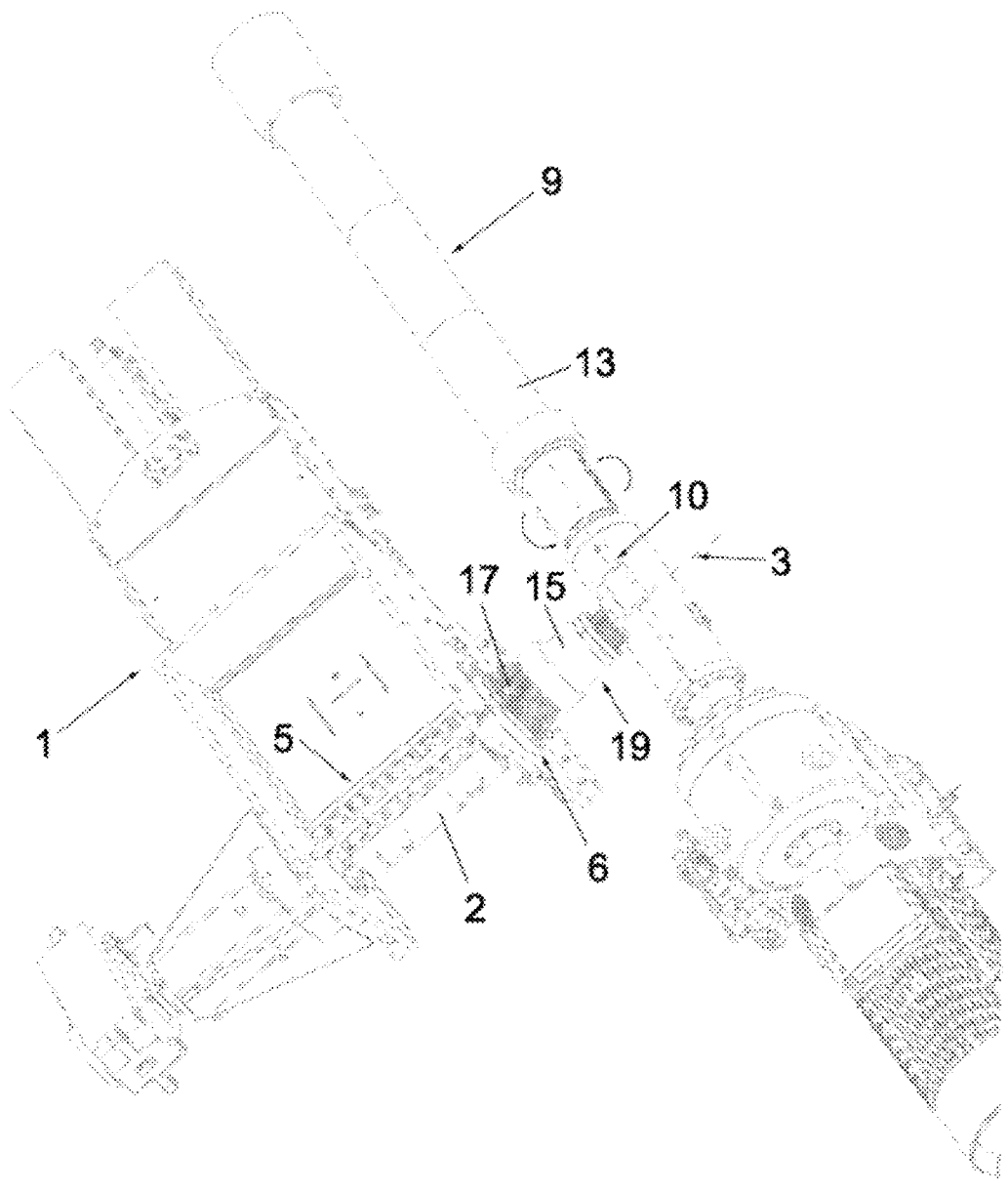
FIG. 1 shows an example embodiment of the device according to the invention in perspective overall view.
Figure 2:
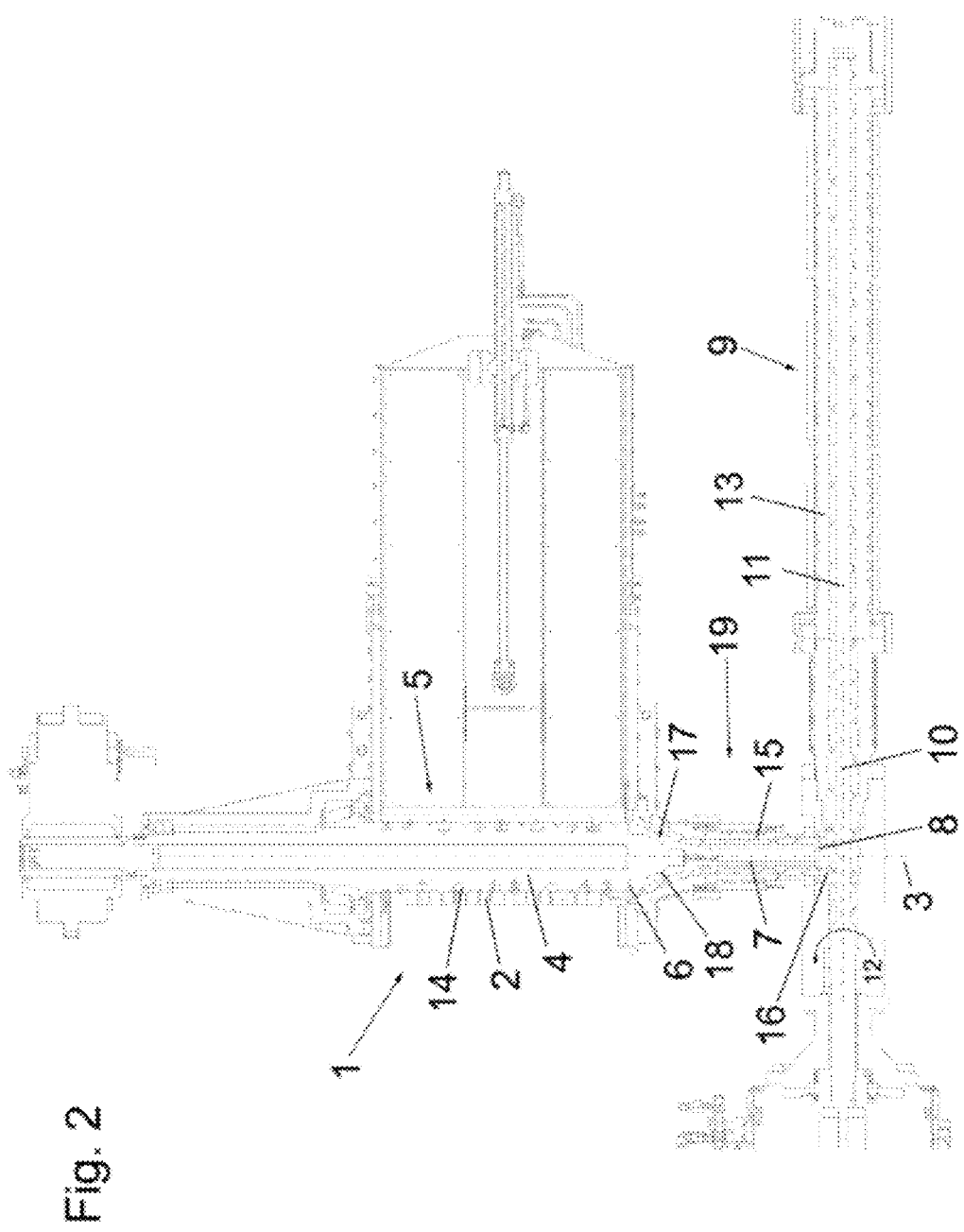
FIG. 2 shows the device according to the invention in a sectional view from above.

In the FIGS. 1 and 2, the device according to the invention is shown in its entirety. The device comprises, as main components, a shredding unit 1, a conveying unit 19 having a screw 7 and connected thereto downstream or in the conveying direction, and an extruder 9 connected thereto further downstream or in the conveying direction.

The shredding unit 1 serves for shredding and optionally heating the fed material. This is a single-shaft shredder with a shredding housing 2, in which a roller-shaped rotor body 4 is provided which is able to be driven in rotation about its longitudinal axis. The rotor body 4 bearing a multiplicity of shredding tools 14 on its circumference. These blades cooperate with counter blades that are arranged stationary on the inside of the shredding housing 2.

The shredding housing 2 is substantially cylindrical and encloses the rotor body 4 over most of its circumference wherein the exposed circumferential region is in the upper half of the circumference and forms the feed opening 5 for the material to be processed and shredded. The material is fed via the feed opening 5 to the rotor body 4 and is gripped by it. The material shredded in this way is conveyed in the direction to an output region 6 arranged on the front side of the shredding housing 2.

Downstream or in the material conveying direction, the conveying unit 19 having a housing 15 and a screw 7, which is mounted therein and is able to be driven in rotation, for conveying and optionally compressing the material output from the shredding unit 1, is arranged at the output region 6 of the shredding unit 1. The longitudinal axis of the rotor body 4 and the longitudinal axis 3 of the screw 7 are aligned coaxially or equiaxially to one another. The shredding unit 1 is designed in such a way that the material is conveyed in the axial direction of the rotor body 4 to and through the output region 6, front-sided to the screw 7. To impart this component of motion to the material in the axial direction of the rotor body 4, the inner wall of the shredding housing 2 opposite the rotor body 4 carries a multiplicity of helically extending wide grooves separated from one another by wide ribs.

The cylindrical shredding housing 2 has a larger inner diameter than the cylindrical housing 15 of the screw 7. The shredding housing 2 and the housing 15 are accordingly connected to one another by a conical transition portion 17, it being provided that a conical screw 18 is arranged in the conical transition portion 17 for conveying and optionally compressing the material.

Such single-shaft shredders, in particular the combination of a shredding unit and a conveying unit, are described, for example, in AT407971, pages 4 and 5, and are incorporated by reference into the subject matter of the present disclosure.

The extruder 9 having an extruder housing 13 and an extruder screw 11 mounted therein and able to be driven in rotation is connected to the downstream front side of the screw 7. A front-side discharge opening 8 is formed in the housing 15, via which the material is conveyed into the intake opening 16 of the extruder 9 towards the extruder screw 11.

The central longitudinal axis 3 of the screw 7 is aligned at a right angle to the central longitudinal axis 10 of the extruder screw 11.

Figure 3:
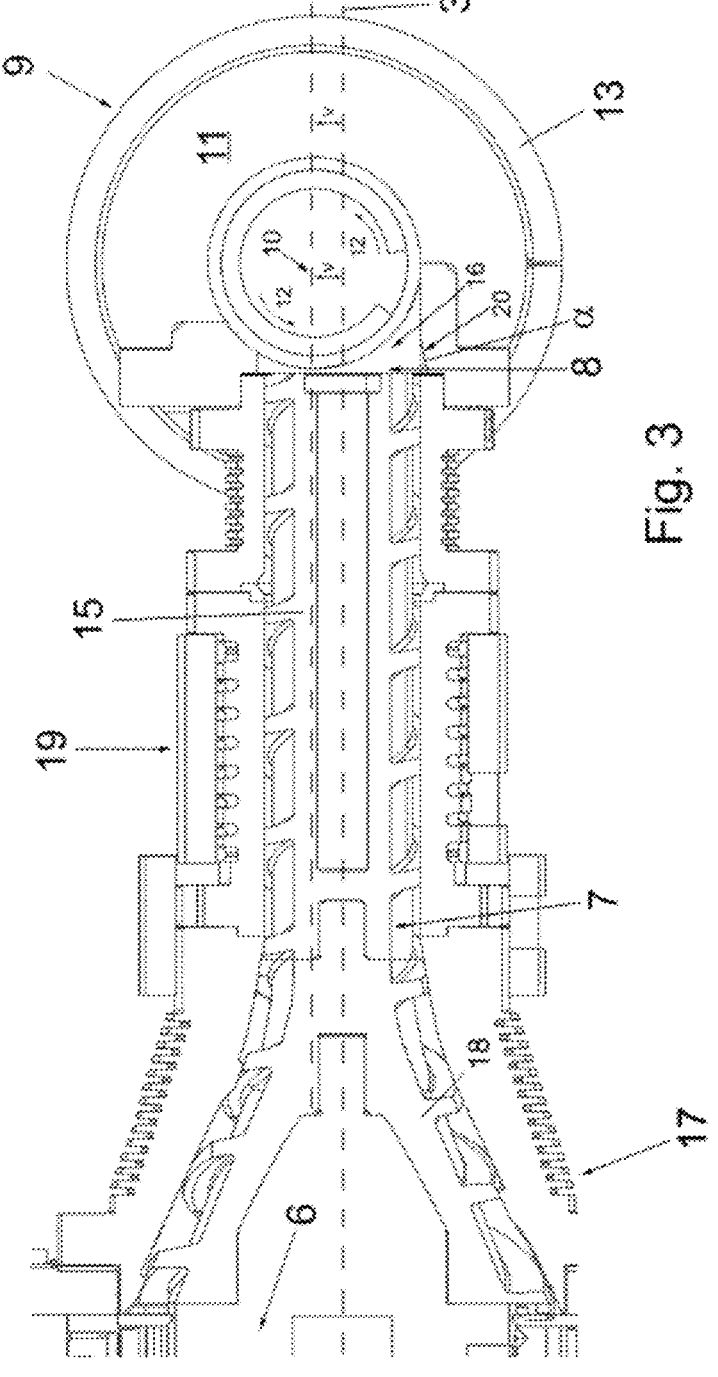
FIG. 3 shows a section of the device according to the invention in a sectional view from the side.
Figure 4:
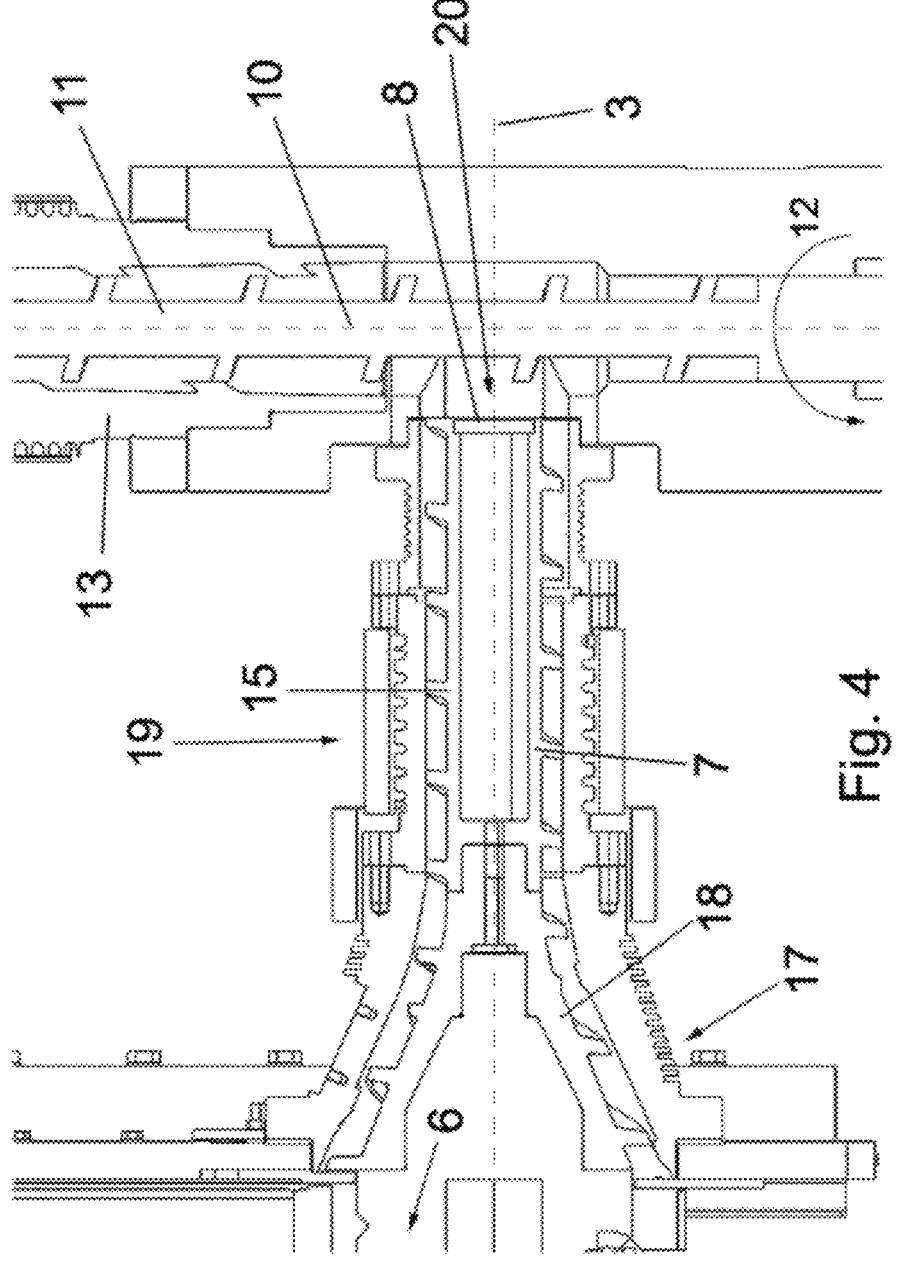
FIG. 4 shows the same section in a sectional view from above.

As shown in FIGS. 3 and 4, the longitudinal axis 3 of the screw 7 is offset with respect to the longitudinal axis 10 of the extruder screw 11 by the offset v, namely in a certain direction, namely in the direction of rotation 12 of the extruder screw 11, viewed at or in or in front of the region of the discharge opening 8.

The longitudinal axis 3 of the screw 7 and the longitudinal axis 10 of the extruder screw 11 are thus not at the same height, but the longitudinal axis 3 of the screw 7 is closer to the bottom or, in the device according to FIGS. 1 and 2 below the longitudinal axis 10 of the extruder screw 11.

The longitudinal axis 3 of the screw 7 defines an x-axis, the longitudinal axis 10 of the extruder screw 11 defines a y-axis. The offset occurs along the z-axis, thus in a direction normal to the longitudinal axis 3 of the screw 7 and to the longitudinal axis 10 of the extruder screw 11.

Essential is the direction of the offset v. The offset v namely occurs in the direction in which the extruder screw 11 rotates in the region of or directly in front of the discharge opening 8 or the intake opening 16 of the extruder (direction of rotation 12). In the device according to the figures, the extruder screw 11 rotates counterclockwise as viewed from behind or from the drive of the extruder 9. The screw 7 opens into the extruder 9 laterally from the left, also viewed from the rear or from the drive. The offset v of the longitudinal axis 3 of the screw 7 occurs accordingly downward, i.e. the longitudinal axis 3 of the screw 7 opens out into the region of the extruder screw 11 that is somewhat closer to the bottom.

The intake opening 16 of the extruder 9 has, in the direction of the offset v, a bottom surface 20 located in the bottom region during operation, which is inclined at an angle α of about 15° to the longitudinal axis 3 or to the horizontal.

The invention claimed is:

1. A device for processing plastics material, comprising
a shredding unit for shredding and optionally heating the material having a shredding housing in which a rotor body that is able to be driven in rotation about a longitudinal axis of the rotor body, is provided, which bears a multiplicity of shredding tools on a circumference of the rotor body, and having a feed opening through which the material to be shredded is able to be fed to the rotor body;
a conveying unit, adjoining an output region of the shredding unit, having a housing and a screw, which is mounted therein and is able to be driven in rotation, for conveying and optionally compressing material output from the shredding unit, wherein the shredding unit or the rotor body is configured such that the material is able to be conveyed in an axial direction of the rotor body towards and through the output region, on a front side of the screw, and wherein the longitudinal axis of the rotor body and a longitudinal axis of the screw are oriented parallel to one another; and
and an extruder, adjoining the screw, having an extruder housing and at least one extruder screw that is mounted therein and able to be driven in rotation, wherein a front-side discharge opening is formed in the housing, via which the material is able to be conveyed into an intake opening of the extruder to the extruder screw,
wherein,
the longitudinal axis of the screw is oriented at an angle to a central longitudinal axis of the extruder screw, the longitudinal axis of the screw and the central longitudinal axis of the extruder screw extending in X-Y axis directions,
and the longitudinal axis of the screw is offset with respect to the longitudinal axis of the extruder screw in a Z-axis direction relative the X-Y axes directions by an offset distance in a direction of rotation of the extruder screw at or in a region of the discharge opening or the intake opening, wherein the Z-axis is orthogonal to the X-Y axes directions;
wherein the offset distance is in a range of $0 < v < R$, wherein R is a radius of the extruder screw.

2. The device according to claim 1, wherein the longitudinal axis of the screw is closer to a bottom than the longitudinal axis of the extruder screw by the offset direction when the device is set up ready for operation.

3. The device according to claim 1, wherein the intake opening of the extruder has, in a direction of the offset distance, a bottom surface which is inclined at an angle α with respect to the longitudinal axis and which is opening outwards, wherein the angle α is in a range of $0° < α < 20°$.

4. The device according to claim 1, wherein the shredding housing has a larger inner diameter than the housing of the screw.

5. The device according to claim 1, wherein the housing is cylindrical or has a conical shape.

6. The device according to claim 1, wherein the shredding housing and the housing are connected to one another by a conical transition portion, wherein a conical screw is arranged in the conical transition portion for conveying and optionally compressing the material.

7. The device according to claim 1, wherein the screw is a non-compressing conveying screw or a screw which at least partially compresses, plasticizes and/or agglomerates the material.

8. The device according to claim 1, wherein the screw forms a support for the rotor body with an extension of a core of the screw projecting into a front end of the rotor body facing the screw.

9. The device according to claim 1, wherein the rotor body is coupled to the screw, and optionally also to a conical screw, in a rotationally locked manner and is driven by a common drive.

10. The device according to claim 1, wherein the shredding unit is a single-shaft shredder.

11. The device according to claim 1, wherein the rotor body is roller shaped.

12. The device according to claim 1, wherein the longitudinal axis of the rotor body and the longitudinal axis of the screw are oriented coaxially with one another.

13. The device according to claim 1, wherein the central longitudinal axis of the screw is oriented at an angle of between 80° to 100° to the central longitudinal axis of the extruder screw.

14. The device according to claim 1, wherein the central longitudinal axis of the screw is oriented at an angle of 90° to the central longitudinal axis of the extruder screw.

15. The device according to claim 4, wherein the shredding housing is cylindrical.

* * * * *